A. C. ROEBUCK.
FILM REELING MECHANISM.
APPLICATION FILED DEC. 17, 1908.

961,536.

Patented June 14, 1910.
5 SHEETS—SHEET 1.

Fig. 1.

Attest:
M. H. Holmes.
Henry Moe.

Inventor:
Alvah C. Roebuck,
by Robert Burns, Atty.

A. C. ROEBUCK.
FILM REELING MECHANISM.
APPLICATION FILED DEC. 17, 1908.

961,536.

Patented June 14, 1910.

Attest:
M. H. Holmes.
Henry Moss.

Inventor:
Alvah C. Roebuck,
by Robert Burns, Atty.

A. C. ROEBUCK.
FILM REELING MECHANISM.
APPLICATION FILED DEC. 17, 1908.

961,536.

Patented June 14, 1910.
5 SHEETS—SHEET 5.

Attest:
M. H. Holmes
Henry Mos.

Inventor:
Alvah C. Roebuck,
by Robert Burns
Att'y.

UNITED STATES PATENT OFFICE.

ALVAH C. ROEBUCK, OF CHICAGO, ILLINOIS.

FILM-REELING MECHANISM.

961,536.  Specification of Letters Patent.  Patented June 14, 1910.

Application filed December 17, 1908. Serial No. 468,008.

*To all whom it may concern:*

Be it known that I, ALVAH C. ROEBUCK, a citizen of the United States of America, and a resident of Chicago, in the county of Cook and State of Illinois, have invented certain new and useful Improvements in Film-Reeling Mechanisms, of which the following is a specification.

This invention relates to a film reeling mechanism for kinetoscopes, and more especially to the type of such reeling mechanism set forth in detail in my prior application for Letters Patent, Serial No. 413,347, filed January 30, 1908. And the present improvement has for its various objects: to provide a simple, efficient and convenient duplex film mechanism with fire proof magazines and accessories, by means of which the automatic rewinding of the film already shown is effected while a second film is being exhibited, and so that when said second film has passed through the apparatus the first one is wound back on its delivery reel ready for repassage through the apparatus, and so on in an alternating manner an indefinite number of times. To provide in connection with such duplex reeling mechanism, an intermediate shift mechanism adapted to positively engage the reel which is in position to receive the film passing through the kinetoscope to the rotating reel shaft, while the companion receiving reel is released and runs loosely on said shaft, the change in the engagement of said reels with the reel shaft being automatically effected by a reverse movement of the head which carries said reels, reel shaft and intermediate shift mechanism. To provide in connection with said intermediate shift mechanism, means to prevent damage to the mechanism when the parts are not in proper meshing alinement, and still insure a proper engagement of the parts as they reach such alinement. To provide a simple and efficient friction tension for the take-up reel mechanism, and which admits of the change from one set of take-up reel to the other without effecting such tension. To provide a simple and substantial detachable connection between the film reels and their carrying shafts and supporting arms, and which admits of a ready and rapid detachment of the reels when required while normally holding said reels in place in a substantial manner. To provide a simple and automatic brake mechanism for the lower film reels whereby the rotation of the same when running loose is retarded and a formation of slack in the film prevented. All as will hereinafter more fully appear.

In the accompanying drawings.

Similar numerals of reference indicate like parts in the several views.

Referring to the drawings, 1 represents the main frame or housing of the kinetoscope, preferably of the closed form shown, and in which is arranged the film feeding light controlling and other kindred mechanisms, usual to a kinetoscope.

2 is the main shaft of the apparatus, having an operating hand crank and operatively connected to the train of gearing located within the housing 1 and by which the different aforesaid mechanisms are operated in unison, as set forth in my prior applications for Letters Patent Serial Nos. 413,346, and 425,094, filed January 30th, and April 4th, 1908, respectively.

3 and 4 are upper and lower reel arms, preferably of the tubular form shown, and having an arrangement at one side of the focal axis of the kinetoscope substantially the same as in my aforesaid application Serial No. 413,347. The attachment of said arms to the kinetoscope housing is preferably of an identical construction to that shown in said application Serial No. 413,347, and so that such prior reeling mechanism and the present duplex reeling mechanism will be interchangeable upon the kinetoscope housing as occasion may require. The means of attachment above referred to are preferably a series of set screws 5 as shown.

6 and 7 are hollow revoluble heads mounted on the outer or free ends of the aforesaid upper and lower reel arms 3 and 4, and adapted to have a semi-revolution thereon in a plane at right angles to the longitudinal center of said arms. Said heads are locked in place at either end of their semi-revolution by locking pins 8, moving in the reel arms and engaging suitable orifices in the revoluble heads as shown.

9 and 10 are transverse reel carrying shafts journaled in side bearings or bushings carried by the heads 6 and 7 in a manner which admits of an endwise shift of said shafts for purposes hereinafter set forth, and motion is imparted to said shafts from the driving mechanism of the kinetoscope by the intermediate operative connections hereinafter described in detail.

11 are circular rims on opposite sides of the revoluble heads aforesaid, such rims have concentric relation to the aforesaid reel carrying shafts and are formed with beveled peripheries as shown to provide means for the attachment of the film magazines in the detachable manner hereinafter described.

12, are the fire proof film magazines, preferably of the drum shape shown, and each provided at its outer end with the usual hinged door or lid 13, and with a film outlet 14 in its periphery, preferably of the fire trap construction described in my aforesaid application Serial No. 413,347.

15 are carrying spiders secured to the inner fixed heads of the aforesaid film magazines. Each spider is provided with a series of circularly arranged lugs 16, one of which is of the overhanging form shown and made radially adjustable on the spider to permit of limited adjustment of the film magazine in an assemblage of the parts, while the other lug receives a radial clamping screw 17, the inner end of which engages the bevel periphery of the circular rim 11 before described, and in conjunction with the other lug secure the film magazine in place on the reel arm in a readily detachable manner. Said magazines are capable of a limited turning adjustment in manner set forth in my aforesaid application Serial No. 413,347, and so that each film outlet may be brought into proper alinement with the film feeding mechanism of the kinetoscope, or into a position in direct alinement with each other in the film rewind operation of the mechanism.

18, 18' and 19 19' are the pairs of upper and lower film reels of the present duplex reeling mechanism. Such reels are arranged within the aforesaid film magazines, and are mounted on the ends of the reel shafts 9 and 10, and secured in position in the detachable manner, now to be described.

Figures 4, 5:
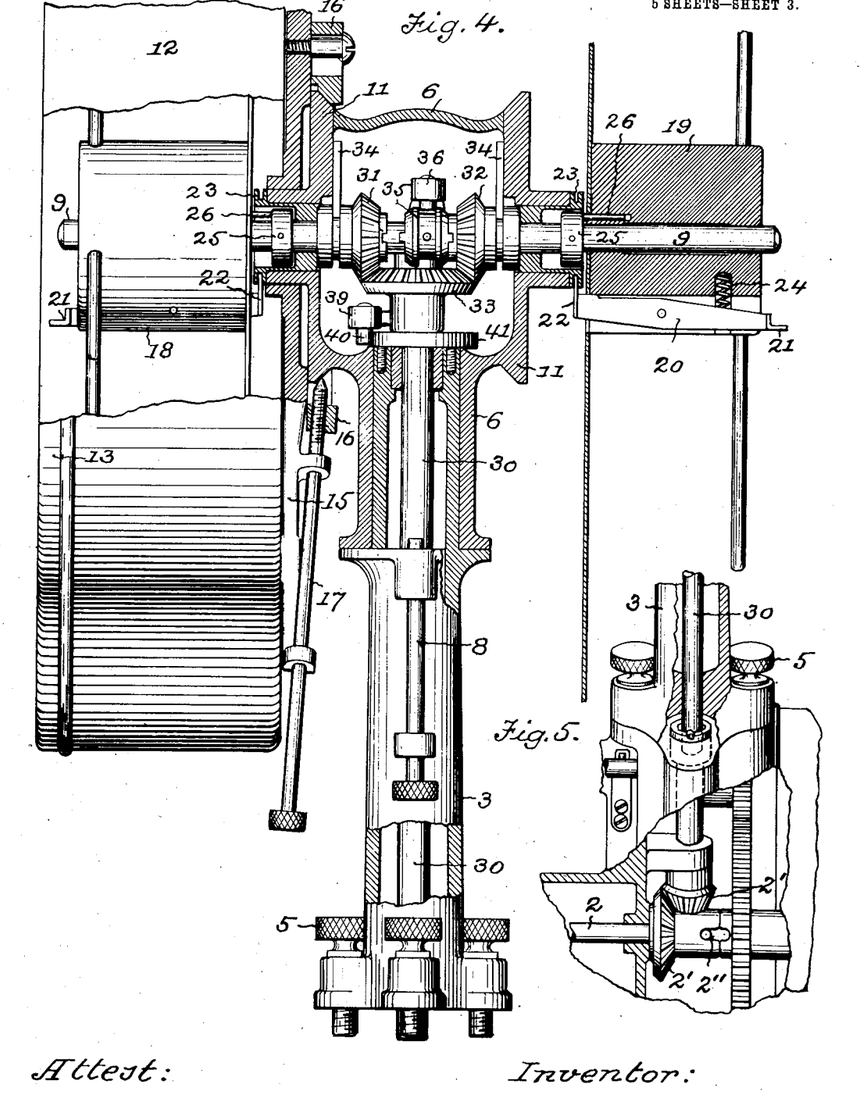
Fig. 4, is an enlarged detail sectional elevation of the upper pair of reels, their carrying arm and connecting mechanism.
Fig. 5, is a detail sectional elevation of the lower end of the upper reel carrying arm etc. and illustrating the intermittent connection between the driving shaft of the kinetoscope and the intermediate shaft by which the upper reel carrying shaft may be positively driven.
Figures 6, 7, 8:
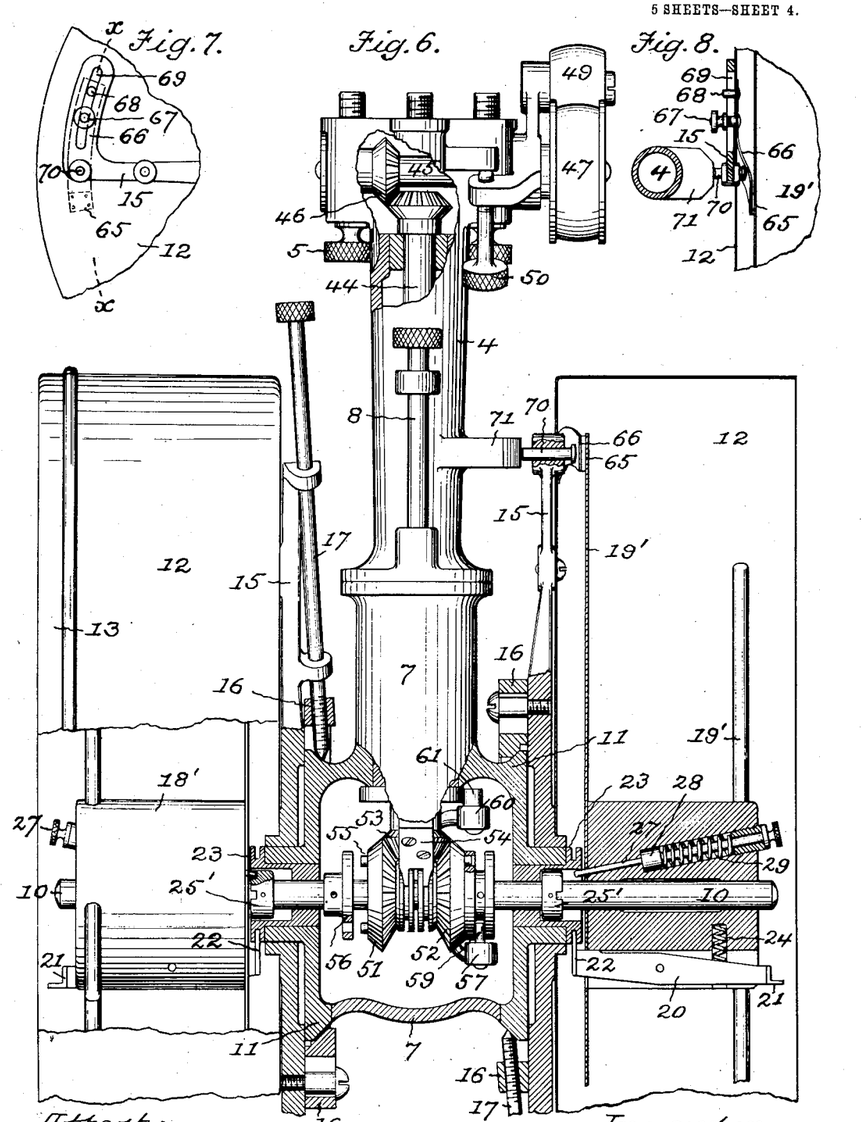
Fig. 6, is an enlarged detail sectional elevation of the lower pair of reels, their carrying arm and operating mechanism.
Fig. 7, is a detail side view illustrating the adjustable brake mechanism of the lower film reels.
Fig. 8, is a detail section of same on line $x$—$x$, Fig. 7.

20 are latch levers arranged in transverse recesses in the hub portion of the film reels and pivoted therein midway the length of said hubs, with their ends provided with thumb pieces 21 for manual actuation, and with their inner ends provided with prongs 22 adapted to engage in peripheral recesses in the bushings 23 in which the reel shafts 9 and 10 have bearing, as shown more particularly in Figs. 4 and 6.

24 are springs tending normally to hold the prongs 22 of the latch lever in engagement with the peripheral recesses of the bushings 23.

25 and 25' are collars fixed on the aforesaid reel shafts and having movement in cavities formed therefor in the bushings 23, aforesaid. Such collars are adapted for detachable driving engagement with the film reels by means as follows: In the case of the two upper reels:—26 are elongated coupling pins carried by the collars 25 aforesaid, and adapted to engage in corresponding orifices formed therefor in the hub portions of said reels. The length of such pins is such that the lateral shift of the reel carrying shafts can be effected without disengagement of said pins from the orifices, and so that operative engagement will prevail at all times between the reel shaft and reels during the active reeling operation of the mechanism, and while normally running free from any driving connection with the operating mechanism of the kinetoscope. In the case of the two lower reels:—27 are coupling pins having lateral movement in the hubs of said reels and provided with stop collars 28 by which their inward movement under the stress of the springs 29 is restricted, and so that in the transverse shift of the lower reel shaft collars 25', one or the other of said pins 27 will be in engagement with its individual collar. To such end each collar 25' will have one or more receiving recesses in its outer face for engagement with the inner end of its coupling pin 27. With the described construction as a collar 25' is moved laterally to engage its coupling pin, and in case its receiving recess is not in alinement with the end of said pin, the action will be to move the pin outward against the stress of the spring 29 and hold the same in such position until in the rotation of the collar the aforesaid recess is brought into alinement with the end of the pin which then moves into place to lock the parts together. With such construction breakage of parts during the coupling operation is very effectively prevented.

30, is a shaft journaled in the upper reel arm 3 and operatively connected at its lower end to the main driving shaft of the kinetoscope by a pair of bevel gears 2' and a clutch 2'', as shown in Fig. 5, and as set forth in detail in my aforesaid application Serial Number 413,347. At its other end the shaft 30 is operatively connected to the upper reel carrying shaft 9, by bevel gear and clutch connections now to be described.

31 and 32 are bevel gears mounted loosely on the upper reel shaft 9 and arranged at opposite sides of a bevel gear 33 secured to the shaft 30, and with which they mesh and are driven. Said bevel gears 31 and 32 are held in proper meshing engagement with the bevel gear 33 by stationary yoke plates 34 secured to the hollow head 6 of the upper reel arm and engaging in peripheral grooves in the hub portions of said gears as shown in Fig. 4. With the described arrangement the upper reel shaft is free to shift transversely through said gears without effecting their engagement with the driving bevel gear 33, aforesaid. The other and opposed ends of the hubs of said bevel gears 31 and 32 are formed with detent clutch members for alternate engagement with a movable clutch member 35 pinned or otherwise secured to the reel shaft and having a detent formation on each end; such movable clutch member being arranged between the bevel gears 31 and 32, as illustrated in Fig. 4.

Figure 9:
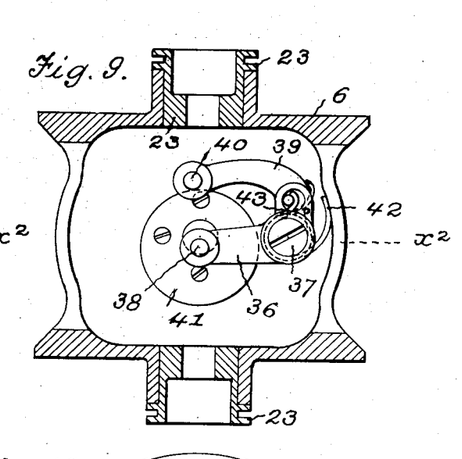
Fig. 9, is a detail section on line $x'$—$x'$ Figs. 2 and 10 of the head portion of the upper reel carrying arm, and showing the clutch shifting arms and operating eccentric, the reel shaft, clutch and gears being removed.
Figure 10:
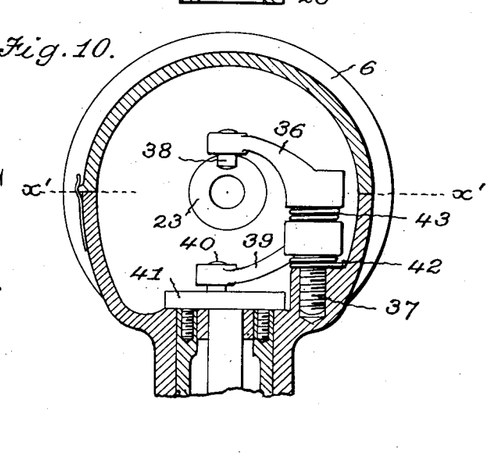
Fig. 10, is a detail vertical section of the same on line $x^2$—$x^2$, Fig. 9.

36 is a shift arm fulcrumed as shown in Figs. 9 and 10 on a stud 37 screwed or otherwise secured to the hollow reel arm head 6, and having at its free end a stud or pin 38 for operative engagement in a peripheral groove in the movable clutch member 35 aforesaid. 39 is a secondary arm also fulcrumed on the stud 37 aforesaid, and having at its free end a stud or pin 40 for engagement with the periphery of an eccentric 41 secured to the reel arm 3 in a stationary manner, and encircling the driving shaft 30, aforesaid.

42 is a spring tending to yildingly hold the secondary arm 39 to its operative engagement with the eccentric 41 aforesaid.

43 is a spring connection between the shift arm 36 and the secondary arm 39, for the purpose of providing a yielding means between the two arms, so that in case the detents of the clutch mechanism aforesaid, do not happen to be in proper alinement, an independent rotation of the movable clutch member may take place until such alinement is reached, without danger of breakage or damage to the parts.

Figure 1:
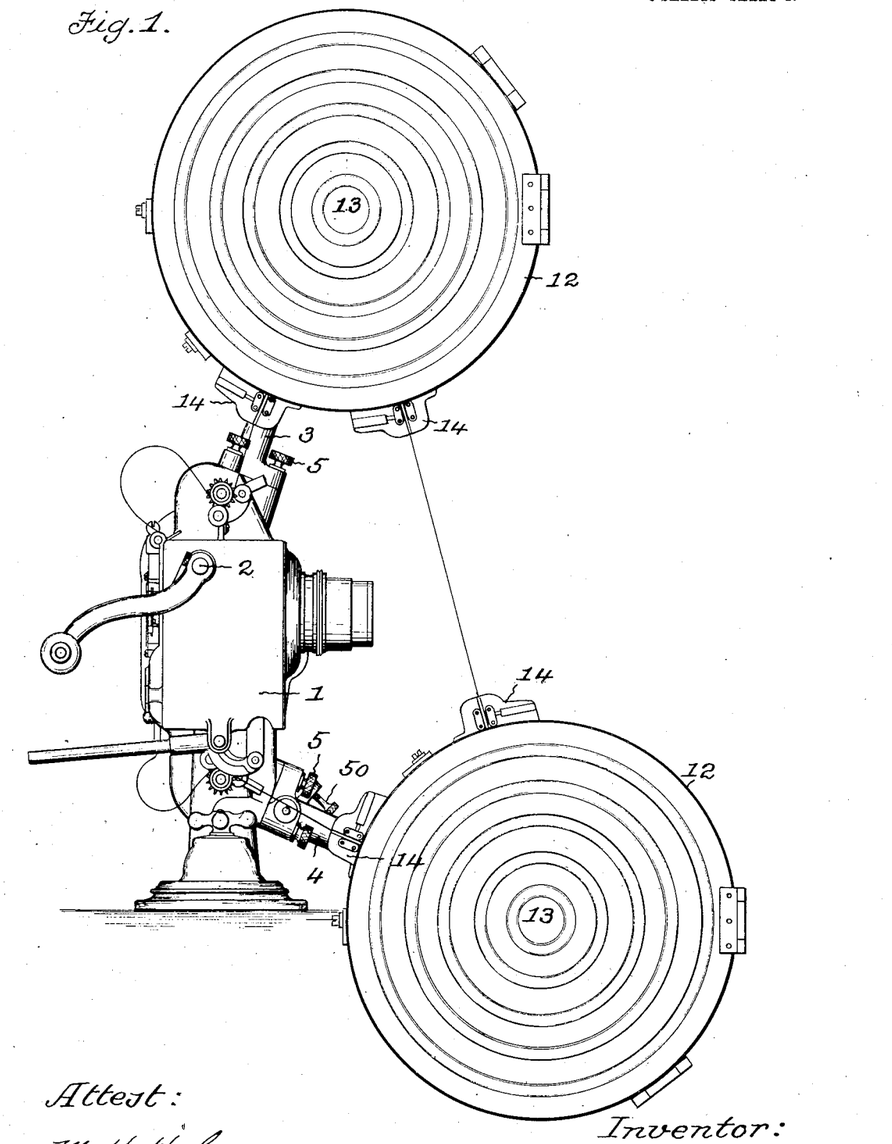
—Figure 1, is a side elevation of a kinetoscope with the present duplex reeling mechanism in place.
Figures 2, 3:
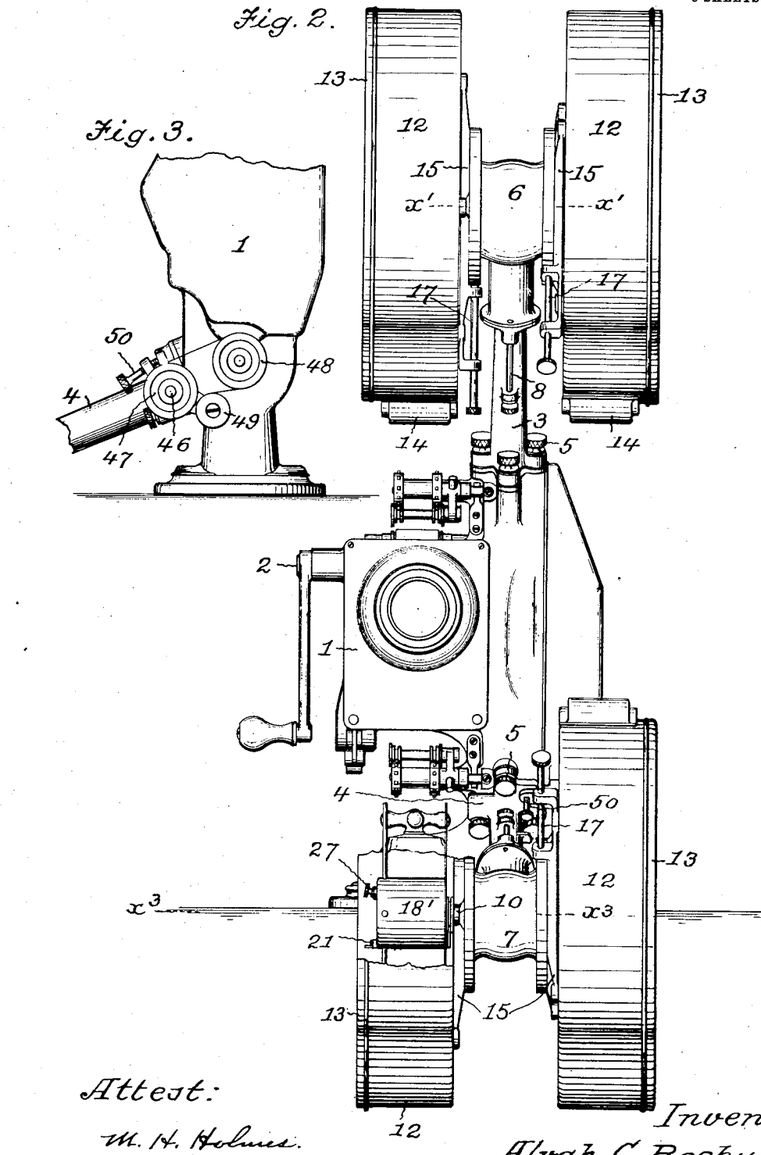
Fig. 2, is a front elevation of the same with parts broken away.
Fig. 3, is a detail side elevation illustrating the driving connection of the take-up reels and the means for tensioning the same.

44 is a shaft journaled in the lower reel arm 4 and operatively connected to the driving mechanism of the kinetoscope by a cross shaft 45 having bevel gear connection 46 with one end of the shaft 44. The cross shaft 45 in turn carries a pulley 47 having an endless belt connection with a pulley 48 mounted on one of the shafts of the driving mechanism of the kinetoscope, as illustrated in Figs. 3 and 5.

49 is an idler pulley, the carrying frame of which is journaled on the cross shaft 45, and is provided with an adjusting screw 50, by which the idler pulley can be adjusted to increase or diminish the tension of the transmission belt aforesaid, and as circumstances may require in the practical operation of the apparatus. The other end of the shaft 44 is operatively connected to the lower reel carrying shaft 10 in substantially the same manner as above set forth in connection with the upper reel carrying shaft 9, such connections comprising parts as follows: 51 and 52 are bevel gears running loosely on the lower reel shaft 10 and arranged at opposite sides of a bevel gear 53 secured to the shaft 44, and with which they mesh and are driven. Said bevel gears 51 and 52 being held in operative engagement with the bevel gear 53, by a central stationary yoke plate 54 secured to the hollow head 7 of the lower reel arm and engaging in peripheral grooves in the hub portions of said gears as shown in Fig. 6; such construction permits of a free shifting movement of the reel shaft 10 through said gears without disturbing their engagement with the driving bevel gear 53 aforesaid. The outer ends of the hubs of said bevel gears 51 and 52 are provided with detent pins 55 for alternate engagement in orificed collars 56 pinned or otherwise secured to the reel shaft 10, and forming the movable member of the clutch mechanism by which one or the other of the bevel gears 51 or 52, are brought into driving engagement with said reel shaft.

Figure 11:
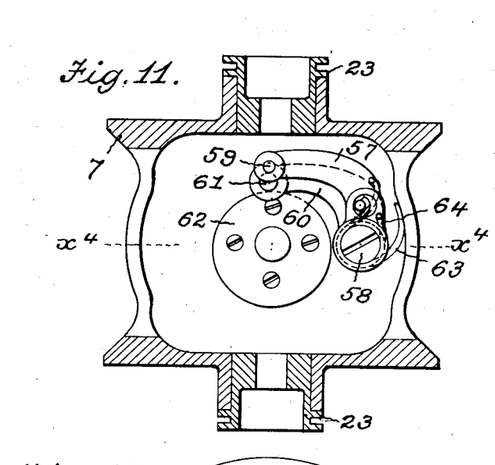
Fig. 11, is a detail section on line $x^3$—$x^3$, Figs. 2 and 12, of the head portion of the lower reel carrying arm, and showing the clutch shifting arms and operating eccentric, the reel shaft, clutch and gears being removed.
Figure 12:
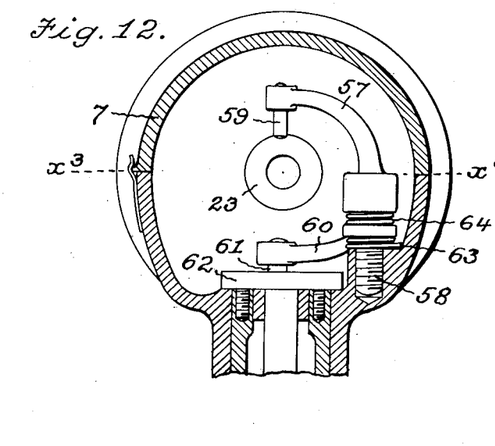
Fig. 12, is a detail vertical section of the same on line $x^4$—$x^4$, Fig. 11.

57 is a shift arm fulcrumed as shown in Figs. 11 and 12 on stud 58 screwed or otherwise secured to the hollow reel arm head 7 and having at its free end a stud or pin 59 for operative engagement in a peripheral groove in one of the collars 56 aforesaid. 60 is a secondary arm also fulcrumed on the stud 58 aforesaid and having at its free end a stud or pin 61 for engagement with the periphery of an eccentric 62 secured to the reel arm 4 in a stationary manner and encircling the driving shaft 44, aforesaid.

63 is a spring tending to hold the secondary arm 60 to its operative engagement with the eccentric 62, in a yielding manner.

64 is a spring connection between the shift arm 57 and the secondary arm 60, and adapted to provide a yielding means between the two arms, and for the same purpose set forth in connection with the arms 36 and 39, aforesaid.

65 are brake shoes having bearing against the sides of the lower set of film reels, and preferably near the peripheries thereof, such brake shoes are carried on the free ends of spring bars 66, the other ends of which are secured to the fixed end heads of the spiders of the lower film magazines 12, 12 in a circularly adjustable manner by means of clamping screws 67, steady pins 68 and elongated slots 69, so that the relation of said spring bars to the hereinafter described operating plungers may be varied to increase or decrease the braking effect of the brake shoes upon the lower film reels, with a corresponding change in the degree of retardation exerted.

70 are lateral plungers moving in guide orifices in the carrying spiders of the film magazines, with the outer ends of said plungers adapted to have bearing against the spring bars 66 intermediate of the aforesaid means of attachment and the brake shoes. At their inner ends said plungers are adapted, in the reversal movements of the film reels and accessories, to be alternately brought into operative contact with a cam projection 71, on the right hand side of the lower reel arm 4, to force the brake shoe into braking engagement with the lower film reel in a position to the right of the apparatus, and which reel when in such location is free from driving connection with the reel carrying shaft on which it is mounted.

The herein described construction provides two film reels and their inclosing fire proof film magazines on the upper reel arm, and two companion film reels and their inclosing fire proof magazines on the lower reel arm, and so arranged that a picture film carried from one upper reel to its companion lower reel is passing through the kinetoscope and exhibited, another film, previously exhibited, is being wound back from the other lower reel onto its companion upper reel so as to be ready for reëxhibition. The required change being effected by a simultaneous semi-rotation of the revoluble heads of the upper and lower reel arms, to bring the last mentioned reels into line with the focal axis of the kinetoscope, and the first mentioned reels into a position for a rewinding operation of the film thereof while the film of the other set is being exhibited. Both the upper reels and the upper reel shaft carrying the same normally turn in the reel arm free from driving connection with the operating mechanism of the kinetoscope, except in the instance hereinafter set forth. In the case of the lower reels, the one in the position to the left in the drawings is only in driving connection with the lower reel carrying shaft, while the lower reel in a position to the right is unconnected and runs free except as to the impediment thereof by the brake mechanism heretofore described. The purpose of such brake mechanism is to retard the rotation of the lower reels in the initial unwinding of the film therefrom and until a period is reached in the film rewinding operation when there is an equal amount of film on both the upper and lower reels. With such retardation, the formation of slack in the film is prevented, and which would otherwise occur from the fact that the live shaft upon which the lower reel, in its rewind condition is loosely mounted, normally tend to frictionally drive said lower reel at a greater speed than is required in the first part of the rewinding operation. In the present mechanism positive rotation is applied solely through the lower reel carrying shaft in connection with the reel that is located on the left hand end of the shaft. The winding of the film onto this lower left-hand reel from the upper reel and the constant fixed connection between the upper left-hand reel to the reel shaft, imparts rotation to the upper reel shaft, and this in turn, through its constant connection with the upper right-hand reel acts to draw the film from the lower right-hand reel, which turns loosely on the lower reel shaft, but held in check by the heretofore described brake, the dual purpose of which is to wind the film on the upper reel with sufficient compactness, and to prevent the loose reel from being carried at too great a speed during the first half of the rewinding from the lower right hand reel. Such tendency, exists on account of the speed of the lower reel shaft being greater than the speed of the loose reel should be during the first half of the rewinding. The result of such greater speed, were it not for the brake, would be to uncoil the film from the loose lower reel faster than it would be taken up by the upper right-hand reel, and in consequence the film would be wound on the upper right hand reel so loosely that it would be liable to form into an eccentric roll and cause the machine to run irregular.

With a view to ease and certainty of operation, it is desirable that the direction in which the film reels are rotated shall continue the same after each shifting of the entire set of reels in manner above stated, and in order to attain such result it is necessary to reverse the engagement of the movable clutch members 35 and 56, with the oppositely running bevel gears 31, 32 and 51, 52, and this is automatically effected by the before described stationary eccentrics 41 and 62, and the secondary arms 39 and 60, and shift arms 36, and 57.

The office of the gear mechanism in the head of the upper reel arm is for the purpose of finishing the rewinding, when the two reels of film that are being used in the machine are not of equal length. The rewinding of the longer reel of film will have to be completed each time from the main crank shaft 2 of the kinetoscope and clutch connection 2'' as set forth in detail in my prior application Serial No. 413,347; and accordingly the office of the shiftable gear connection in the upper reel arm head is to avoid the necessity of reversing the direction in which the operating hand crank is turned, and so that either reel may be operated by hand by turning said crank at all times in the same direction.

Having thus fully described my said invention what I claim as new and desire to secure by Letters Patent, is:—

1. The combination in a kinetoscope, of a reel support arranged to one side of the focal axis thereof, and a pair of film reels shiftably connected to the reel support and adapted to be alternately brought into a line with the focal axis of the kinetoscope, substantially as set forth.

2. The combination in a kinetoscope, of a reel support arranged to one side of the focal axis thereof, and a pair of film reels revolubly connected to the reel support and adapted to be alternately brought into a line with the focal axis of the kinetoscope, substantially as set forth.

3. The combination in a kinetoscope, of a reel arm arranged to one side of the focal axis thereof, a revoluble head mounted on said reel arm, and a pair of film reels arranged on opposite sides of the revoluble head and adapted to be alternately brought into a line with the focal axis of the kinetoscope, substantially as set forth.

4. The combination in a kinetoscope, of a pair of reel supports arranged to one side of the focal axis thereof, and a pair of film reels shiftably connected to each reel support and adapted to be alternately brought into a line with the focal axis of the kinetoscope, substantially as set forth.

5. The combination in a kinetoscope, of a pair of reel supports arranged to one side of the focal axis thereof, and a pair of film reels revolubly connected to each reel support and adapted to be alternately brought into a line with the focal axis of the kinetoscope, substantially as set forth.

6. The combination in a kinetoscope, of a pair of reel arms arranged to one side of the focal axis thereof, revoluble heads mounted on said reel arms, and film reels arranged on opposite sides of the revoluble heads and adapted to be alternately brought in pairs into a line with the focal axis of the kinetoscope, substantially as set forth.

7. The combination in a kinetoscope, of a reel arm arranged to one side of the focal axis thereof, a revoluble head mounted on said reel arm, a reel carrying shaft journaled in said head, a pair of film reels arranged on the ends of said shaft, and operative connections between said reel shaft and the operating mechanism of the kinetoscope, substantially as set forth.

8. The combination in a kinetoscope, of a pair of reel arms arranged to one side of the focal axis thereof, revoluble heads mounted on said reel arms, reel carrying shafts journaled in said heads, film reels arranged on the ends of said shafts, and operative connections between one of said reel shafts and the operating mechanism of the kinetoscope, substantially as set forth.

9. The combination in a kinetoscope, of a reel arm arranged to one side of the focal axis thereof, a revoluble head mounted on said reel arm, a reel carrying shaft journaled in said head, a pair of film reels arranged on the ends of said shaft, an automatic reversing mechanism connected to said reel shaft, and operative connections between the reel shaft and the operating mechanism of the kinetoscope, substantially as set forth.

10. The combination in a kinetoscope, of a pair of reel arms arranged to one side of the focal axis thereof, revoluble heads mounted on said reel arms, reel carrying shafts journaled in said heads, film reels arranged on the ends of said shafts, automatic reversing mechanisms connected to said reel shafts, and operative connections between the reel shafts and the operating mechanism of the kinetoscope, substantially as set forth.

11. The combination in a kinetoscope, of a reel arm arranged to one side of the focal axis thereof, a revoluble head mounted on said reel arm, a reel carrying shaft journaled in said head, a pair of film reels arranged on the ends of said shaft, an automatic reversing mechanism connected to said reel shaft, the same comprising a driving gear, a pair of driven gears turning loosely on the reel shaft and meshing with the driving gear, a clutch member on the reel shaft adapted to engage one or the other of the driven gears, a stationary operating eccentric, and shift arms intermediate of said eccentric and clutch, and operative connections between the driving gear and the operating mechanism of the kinetoscope, substantially as set forth.

12. The combination in a kinetoscope, of a pair of reel arms arranged to one side of the focal axis thereof, revoluble heads mounted on said reel arms, reel carrying shafts journaled in said heads, film reels arranged on the ends of said shafts, automatic reversing mechanisms connected to said reel shafts, each reversing mechanism comprising a driving gear, a pair of driven gears turning loosely on the reel shafts and meshing with the driving gear, a clutch member on the reel shaft adapted to engage one or the other of the driven gears, a stationary operating eccentric, and shift arms intermediate of said eccentric and clutch, and operative connections between the bevel gears and the operating mechanism of the kinetoscope, substantially as set forth.

13. The combination in a kinetoscope, of a reel arm arranged to one side of the focal axis thereof, a revoluble head mounted on said reel arm, a reel carrying shaft journaled in said head and a pair of film reels arranged on the ends of said shaft and coupled thereto by elongated pins, substantially as set forth.

14. The combination in a kinetoscope, of a pair of reel arms arranged to one side of the focal axis thereof, revoluble heads mounted on said reel arms, reel carrying shafts journaled in said heads, film reels arranged on the ends of said shafts, the upper reels being connected to their shaft by elongated coupling pins and the lower reels to their shaft by spring impelled coupling pins, and operative connections between said reel shafts and the operating mechanism of the kinetoscope, substantially as set forth.

15. The combination in a kinetoscope, of a pair of reel supports arranged to one side of the focal axis thereof, upper and lower pairs of film reels shiftably connected to the reel supports and adapted to be alternately brought into a line with the focal axis of the kinetoscope, and a brake mechanism adapted to engage one of the lower film reels and retard the free rotation thereof, substantially as set forth.

16. The combination in a kinetoscope, of a pair of reel supports arranged to one side of the focal axis thereof, upper and lower pairs of film reels revolubly connected to the reel supports and adapted to be alternately brought into a line with the focal axis of the kinetoscope, and a brake mechanism adapted to engage one of the lower film reels and retard the free rotation thereof, substantially as set forth.

17. The combination in a kinetoscope, of a pair of reel arms arranged to one side of the focal axis thereof, revoluble heads mounted on said reel arms, upper and lower film reels arranged on opposite sides of the revoluble heads and adapted to be alternately brought in pairs into a line with the focal axis of the kinetoscope, and a brake mechanism adapted to engage one of the lower film reels and retard the free rotation thereof, substantially as set forth.

18. The combination in a kinetoscope, of a pair of reel supports arranged to one side of the focal axis thereof, upper and lower pairs of film reels shiftably connected to the reel supports and adapted to be alternately brought into a line with the focal axis of the kinetoscope, and a brake mechanism adapted to engage one of the lower film reels and retard the free rotation thereof, the same comprising a brake shoe, a spring bar carrying the same, a plunger adapted to bear against said spring bar, and a cam projection on one of said reel supports for operating said plunger, substantially as set forth.

19. The combination in a kinetoscope, of a pair of reel supports arranged to one side of the focal axis thereof, upper and lower pairs of film reels revolubly connected to the reel supports and adapted to be alternately brought into a line with the focal axis of the kinetoscope, and a brake mechanism adapted to engage one of the lower film reels and retard the free rotation thereof, the same comprising a brake shoe, a spring bar carrying the same, a plunger adapted to bear against said spring bar, and a cam projection on one of said reel supports for operating said plunger, substantially as set forth.

20. The combination in a kinetoscope, of a pair of reel arms arranged to one side of the focal axis thereof, revoluble heads mounted on said reel arms, upper and lower film reels arranged on opposite sides of the revoluble heads and adapted to be alternately brought in pairs into a line with the focal axis of the kinetoscope, and a brake mechanism adapted to engage one of the lower film reels and retard the free rotation thereof, the same comprising a brake shoe, a spring bar carrying the same, a plunger adapted to bear against said spring bar and a cam projection on one of the reel arms for operating said plunger, substantially as set forth.

21. In a reeling mechanism for kinetoscopes, the combination of a reel arm provided with a laterally arranged rim, a film magazine having an attaching spider formed with a circular series of lugs one of which is made radially adjustable, a screw passing through another of said lugs and having bearing against said rim, a reel shaft having a central relation to said rim, a reel carried by said shaft, and means for imparting rotation to said shaft, substantially as set forth.

22. In a reeling mechanism for kinetoscopes, the combination of a reel arm provided with a laterally arranged rim having a beveled periphery, a film magazine having an attaching spider formed with a circular series of lugs one of which is made radially adjustable, a screw passing through another of said lugs and having bearing against the beveled periphery of said rim, a reel carried by said shaft, and means for imparting rotation to said shaft, substantially as set forth.

23. In a reeling mechanism for kinetoscopes, the combination of a reel arm, a reel carrying shaft journaled in said arm, a reel mounted on said shaft, an intermediate shaft journaled in said arm and operatively connected at one end to the reel shaft, a transverse shaft journaled in the reel arm and operatively connected to said intermediate shaft, a belt pulley on the transverse shaft, a belt pulley on a shaft of the kinetoscope driving mechanism, an endless belt connecting said pulleys, and an adjustable idler pulley adapted to control the tension of said belt, substantially as set forth.

24. In a reeling mechanism for kinetoscopes, the combination of a reel arm, a reel carrying shaft journaled in said arm, a reel mounted on said shaft, an intermediate shaft journaled in said arm and operatively connected at one end to the reel shaft, a transverse shaft journaled in the reel arm and operatively connected to said intermediate shaft, a belt pulley on the transverse shaft, a belt pulley on a shaft of the kinetoscope driving mechanism, an endless belt connecting said pulleys, an adjustable idler pulley engaging said belt, and a carrier for said idler pulley fulcrumed on the aforesaid transverse shaft and provided with an adjusting screw, substantially as set forth.

25. In a duplex reeling mechanism for kinetoscopes, the combination of a lower reel arm, a reel shaft journaled in said arm and capable of limited endwise movement, a pair of film reels mounted on said shaft, means for automatically imparting endwise movement to the reel shaft, coupling pins carried by the reels and adapted for alternate engagement with the reel shaft in the endwise movement thereof, and means for imparting rotation to said reel shaft, substantially as set forth.

26. In a duplex reeling mechanism for kinetoscopes, the combination of a lower reel arm, a reel shaft journaled in said arm and capable of limited endwise movement, a pair of film reels mounted on said shaft, means for automatically imparting endwise movement to the reel shaft, yielding coupling pins carried by the reels and adapted for alternate engagement with the reel shaft in the endwise movements thereof, and means for imparting rotation to said reel shaft, substantially as set forth.

27. In a duplex reeling mechanism for kinetoscopes, the combination of a reel arm, a reel shaft journaled in said arm and carrying the movable member of a clutch, a pair of bevel gears mounted loose on the reel shaft and adapted for alternate engagement with said movable clutch member, a transmission shaft journaled in the reel arm and carrying a bevel gear which meshes with the aforesaid bevel gears to drive the same in opposite directions, an eccentric carried by the reel arm, a shift arm engaging the movable clutch member, a secondary arm engaging the eccentric, and a yielding connection between said arms, substantially as set forth.

28. In a duplex reeling mechanism for kinetoscopes, the combination of a reel arm, a reel shaft journaled in said arm and carrying the movable member of a clutch, a pair of bevel gears mounted loose on the reel shaft and adapted for alternate engagement with said movable clutch member, a transmission shaft journaled in the reel arm and carrying a bevel gear which meshes with the aforesaid bevel gears to drive the same in opposite directions, an eccentric carried by the reel arm, a shift arm engaging the movable clutch member, a secondary arm engaging the eccentric, a yielding connection between said arms, and a spring adapted to hold the secondary arm to its engagement with the eccentric, substantially as set forth.

Signed at Chicago, Illinois, this 15th day of December 1908.

ALVAH C. ROEBUCK.

Witnesses:
ROBERT BURNS,
E. W. THOMAS.